Dec. 28, 1948.     B. A. MAIN, JR     2,457,251
QUICK CONNECT SELF-SEALING COUPLING
Filed March 28, 1945
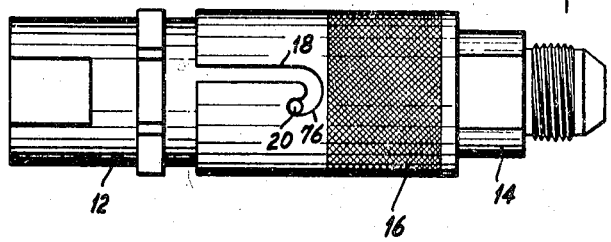
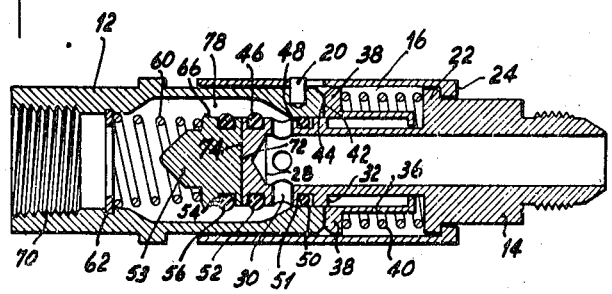
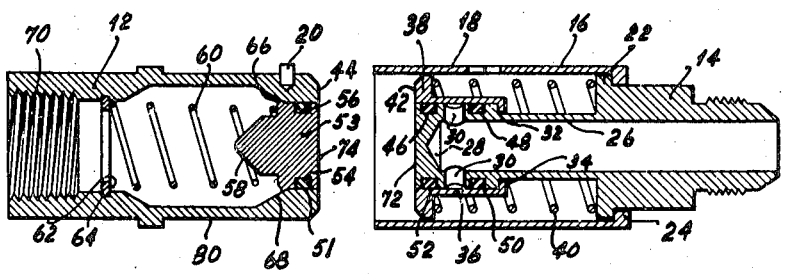
Inventor
BENJAMIN A. MAIN JR.
By Beaman & Langford
Attorney Patented Dec. 28, 1948

2,457,251

UNITED STATES PATENT OFFICE 2,457,251

QUICK CONNECT SELF-SEALING COUPLING

Benjamin A. Main, Jr., Jackson, Mich., assignor, by mesne assignments, to Aeroquip Corporation, Jackson, Mich., a corporation of Michigan Application March 28, 1945, Serial No. 585,307

1 Claim. (Cl. 284—19)

The present invention relates to improvements in self-sealing couplings of the type disclosed in United States Patent No. 2,208,286 granted to Julius Berger July 16, 1940.

It is the object of the present invention to provide a self-sealing coupling of the above identified type in which the moving valve parts are effectively sealed against leakage of the operating fluid by a novel arrangement of sealing rings which are so located that none of them is required to traverse any of the fluid ports of the coupling construction and the number of which sealing rings is reduced to a minimum.

The above and other objects and advantages residing in the construction, combination and arrangement of parts will more clearly appear from a consideration of the following detailed description and the appertured claim.

Referring to the drawings, in which several different embodiments of the invention are illustrated, Fig. 1 is a side elevational view of the coupling parts in assembled or connected position, Fig. 2 is a vertical cross-sectional view of the coupling shown in Fig. 1, Fig. 3 is a view similar to Fig. 2 showing the parts in disconnected position.

The self-sealing coupling unit shown in Fig. 1 of the drawings comprises separable parts 12 and 14 and a quick connect coupling sleeve 16 having a bayonet lock type of slot 18 for quick attachment and detachment with the pin 20 located in the part 12. The part 14 has a flange 22 against which the flange end 24 of the coupling sleeve 16 abuts at the time of engagement.

The part 14 is shown as having an integral tubular portion 26 which terminates in a valve head 28 in which is provided radial ports 30. The head 28 is slightly larger in diameter than the tubular portion 26 to present a flange 32 functioning as a stop for the flange 34 in the sleeve 36 which telescopes with the head 28. An annular shoulder 38 on the sleeve 36 functions as a seat for the compression spring 40 with the outer face 42 abutting with the face 44 of the part 12 providing an outer seal for the parts in assembled position, as shown in Fig. 2.

Spaced upon opposite sides of the radial ports 30 are annular grooves 46 and 48 carrying sealing rings 50 and 52. The part 12 is of tubular construction with a smaller diameter at the cylindrical portion 51 at the forward end adjacent the face 44. Slidably received within the cylindrical portion 51 is part 53, carrying an annular groove 54 in which is received the sealing ring 56. The portion 58 constitutes a pilot for the compression spring 60 which at one end reaches against a snap ring 62 located in a groove 64. A conical flange 66 is provided on the valve part 53 to abut the conical wall 68 and to act as a stop resisting the thrust of the spring 60. Preferably the threaded cylindrical portion 70 of the part 12 is of slightly greater inside diameter than the diameter of the flange 66, thus enabling the part 53 to be assembled by insertion through the cylindrical portion 70.

The engaging faces 72 and 74 are shown as being of flat construction, but it will be understood that they may be of any complementary configuration and of such a design that when engaged with one another substantially all fluid between the same is displaced. The general principles of operation of the present invention are the same as those of the self-sealing coupling disclosed in the aforesaid patent. Only the specific details of construction are different.

With the coupling parts disconnected, as shown in Fig. 3, the sealing ring 56 will provide an effective seal between the valve part 53 and the cylindrical wall 51. In a similar manner the sealing rings 50 and 52 effectively seal the radial ports 30 in engagement with the inner wall of the sleeve 36 on both sides of the ports 30. It will be understood that extremely close tolerances need not be maintained between the telescoping parts yet an effective seal is provided by the sealing rings 50, 52 and 56 which project slightly beyond the annular grooves in which they are located and are held in intimate sealing engagement with the surfaces through fluid pressure. It will be further noted that the arrangement of these sealing rings is such that none of them is required to traverse any of the fluid ports of the coupling structure.

To assemble or connect the parts 12 and 14 together, with the slot 18 in axial alignment with the pin 20, the parts are forced together, bringing the faces 42 and 44 into abutting engagement. Axial opposed pressure against these faces overcomes the tension of the spring 40, compressing the same and displacing the sleeve 36 in the manner shown in Fig. 2. When the sleeve 36 has been sufficiently displaced, rotation between the sleeve 16 and part 12 will position the pin 20 in the locking portion 76 of the groove 18, all in a well-known manner. When this has taken place it will be noted from Fig. 2 that the head 28 has been projected a sufficient distance into the enlarged chamber 78 to permit the flow of fluid through the connected coupling passing through the port 30 and into the chamber 78. With the coupling connected, as shown in Fig. 2, the sealing ring 50 has a transverse sealing engagement between the sleeve 36 and the cylindrical portion 51 of the part 12. It will also be noted that the sealing rings 52 and 56 have no function to perform when the parts 12 and 14 are in their coupled position.

The sliding fit between the inside of the sleeve 16 and the outer cylindrical portion 80 of the coupling part 12 provides axial alignment for the telescoped valve parts.

It will be apparent to those skilled in the art that the herein described construction can be manufactured without maintaining exceedingly close tolerances. Another advantage residing in the present invention which will be readily appreciated is found in the quick connection and disconnection feature made possible by the bayonet-like slot and pin arrangement to enable these parts to be coupled or uncoupled by rotating the sleeve 16 a fractional turn relative to the part 12.

Having thus described my invention, what I desire to secure by Letters Patent and claim is:

A self-sealing coupling of the kind consisting of two tubular body parts of which one comprises an interior co-axial tubular stem closed at the coupling end and defining an annular space between itself and its tubular body part, said tubular stem having fluid-flow ports in its hollow wall portion adjacent said closed end and said ports being closable by a sleeve slidable upon said tubular stem and within said annular space, whereas the other tubular body part has an end opening of a diameter approximating the interior diameter of said sleeve and closable by an axially movable valve member which, when the two body parts are coupled together, is displaced inwardly by contact with the closed end of said stem at the same time as the said sleeve is pushed back along the stem to open said ports due to the endwise pressure exerted against the sleeve by the second said tubular body part characterized in that the said axially movable valve member has a circumferential groove around its outer periphery containing a fluid sealing ring for maintaining a fluid tight seal with the said end opening, when this valve member is closed, and that the said tubular stem also has external circumferential grooves on opposite sides of said fluid-flow ports and containing fluid sealing rings, said sleeve having an inwardly directed shoulder, at the end thereof remote from the closed end of the stem, engageable with a shoulder on the stem to limit the outward axial movement of the sleeve to close said fluid-flow ports and the one sealing ring on the said stem, on the side of the said fluid-flow ports remote from the closed end of the stem, serving, when the sleeve is displaced inwardly by the said second body part, to maintain a fluid seal between the stem and the said end opening in said second body part.

BENJAMIN A. MAIN, JR.

REFERENCES CITED

The following references are of record in the file of this patent:

UNITED STATES PATENTS

| Number | Name | Date |
| --- | --- | --- |
| 1,679,257 | Neebe | July 31, 1928 |
| 1,710,635 | Wertz | Apr. 23, 1929 |
| 2,185,173 | Fortune | Jan. 2, 1940 |
| 2,208,620 | Baisch | July 23, 1940 |
| 2,210,282 | Corbin | Aug. 6, 1940 |
| 2,254,997 | Fisher | Sept. 2, 1941 |
| 2,304,390 | Wolfram | Dec. 8, 1942 |
| 2,311,239 | Main et al. | Feb. 16, 1943 |
| 2,391,022 | Main | Dec. 18, 1945 |

FOREIGN PATENTS

| Number | Country | Date |
| --- | --- | --- |
| 505,681 | Great Britain | May 16, 1929 |